(12) United States Patent
Kim et al.

(10) Patent No.: US 12,394,800 B2
(45) Date of Patent: Aug. 19, 2025

(54) CURRENT COLLECTOR FOR POSITIVE ELECTRODE

(71) Applicant: U&S ENERGY, INC., Cheonan-si (KR)

(72) Inventors: Kyung Joon Kim, Daejeon (KR); Seung Ho Choi, Daejeon (KR); Young Hun Jin, Gyeryong-si (KR)

(73) Assignee: U&S ENERGY, INC., Cheonan-si (KR)

( * ) Notice: Subject to any disclaimer, the term of this patent is extended or adjusted under 35 U.S.C. 154(b) by 463 days.

(21) Appl. No.: 17/641,999

(22) PCT Filed: Sep. 7, 2020

(86) PCT No.: PCT/KR2020/012021
§ 371 (c)(1),
(2) Date: Mar. 10, 2022

(87) PCT Pub. No.: WO2021/060742
PCT Pub. Date: Apr. 1, 2021

(65) Prior Publication Data
US 2023/0402616 A1    Dec. 14, 2023

(30) Foreign Application Priority Data
Sep. 24, 2019    (KR) .................. 10-2019-0117356

(51) Int. Cl.
*H01M 4/66* (2006.01)
*H01M 50/566* (2021.01)

(52) U.S. Cl.
CPC .......... *H01M 4/667* (2013.01); *H01M 4/661* (2013.01); *H01M 4/668* (2013.01); *H01M 50/566* (2021.01)

(58) Field of Classification Search
CPC ........................ H01M 4/667; H01M 4/668
See application file for complete search history.

(56) References Cited

U.S. PATENT DOCUMENTS

| 10,164,263 | B2 | 12/2018 | Kim et al. |
| 2006/0105243 | A1* | 5/2006 | Okamura ............... H01M 4/668 429/234 |
| 2016/0049662 | A1 | 2/2016 | Kim et al. |

FOREIGN PATENT DOCUMENTS

| CN | 208433466 U | 1/2019 |
| EP | 3832764 A1 | 6/2021 |

(Continued)

OTHER PUBLICATIONS

JP2012185938 English translation. Asako et al. Japan. Sep. 17, 2012. (Year: 2012).*

*Primary Examiner* — Christopher P Domone
(74) *Attorney, Agent, or Firm* — NKL LAW; Jae Youn Kim

(57) ABSTRACT

A current collector for a positive electrode according to the present invention may include a base film, a conductive material provided on at least one of upper and lower surfaces of the base film, a metal piece provided on the upper or lower surface of the base film and electrically connected to the conductive material, and a lead tab joined to any one of the metal piece, the conductive material, and the base film and electrically connected to the conductive material, in which the conductive material is positioned between the metal piece and the base film or between the lead tab and the base film, and in which the lead tab is welded to one of the metal pieces provided on the upper and lower surfaces of the base film or welded to the metal piece provided on one surface of the base film that faces the lead tab.

9 Claims, 10 Drawing Sheets

(56) References Cited

FOREIGN PATENT DOCUMENTS

| | | | |
|---|---|---|---|
| JP | 10-302753 | A | 11/1998 |
| JP | 2001-236947 | A | 8/2001 |
| JP | 2009187675 | A | 8/2009 |
| JP | 2012-049109 | A | 3/2012 |
| JP | 2012185938 | * | 9/2012 |
| KR | 10-2006-0068426 | A | 6/2006 |
| KR | 20060068426 | A | 6/2006 |
| KR | 10-2013-0126107 | A | 11/2013 |
| KR | 10-2014-0131115 | A | 11/2014 |
| WO | 2012-093588 | A1 | 7/2012 |

* cited by examiner

CURRENT COLLECTOR FOR POSITIVE ELECTRODE

TECHNICAL FIELD

The present invention relates to a current collector for a positive electrode, and more particularly, to a current collector for an electrode, which can reduce a weight of the electrode without using metal foil, reduce a thickness of an electrode assembly, connect a lead tab securely and stably, and ensure safety of a battery.

BACKGROUND ART

As technical research and demands for mobile devices increase, there are rapidly increasing demands for secondary batteries as energy sources. Among the secondary batteries, lithium secondary batteries have been commercially available and have high energy density and action potential and a low self-discharge rate.

A lithium metal secondary battery is the first secondary battery that has been commercially available. The lithium metal secondary battery uses lithium metal as a negative electrode. However, the lithium metal secondary battery has a problem in that a lithium dendrite formed on a surface of a lithium metal negative electrode causes expansion of volume of a cell, gradual deterioration in capacity and energy density, a short circuit caused by consistent growth of the dendrite, a decrease in cycle lifespan, and deterioration in cell stability (explosion and ignition). For this reason, the production of the lithium metal secondary battery was stopped in a just few years after the secondary lithium metal battery was commercially available. Therefore, there has been used a carbon-based negative electrode that is more suitable than lithium metal and can store lithium in an ionic state in a lattice or vacant space. The use of the carbon-based negative electrode allows the lithium secondary battery to be properly commercially available and come into wide use.

The lithium secondary battery is mainly made of carbon-based or non-carbon-based negative electrode materials up to now. The development of the negative electrode material is mostly focused on carbon-based materials (graphite, hard carbon, soft carbon, etc.) and non-carbon-based materials (silicon, tin, titanium oxide, etc.).

Meanwhile, recently, as portable electronic devices and information communication devices are miniaturized, the lithium secondary battery is significantly expected to be used as an ultra-small power system for operating the devices.

Moreover, recently, development and research have been actively conducted on polymer-based electronic devices and elements using advantages such as flexibility, low cost, and ease of manufacturing. Therefore, to use the miniaturized device, it is necessary to reduce a thickness or weight of the battery while maintaining energy density or performance of the lithium secondary battery.

In addition, a current pass is blocked or destroyed in the event of an internal short circuit even though the thickness or weight of the lithium secondary battery is reduced. Therefore, it is necessary to improve safety of the lithium secondary battery.

Furthermore, even in a case in which the thickness or weight of the lithium secondary battery is reduced, a lead tab configured to be connected to an external device needs to be stably connected to a current collector for an electrode and have sufficient tensile strength to allow the lithium secondary battery to serve as a battery.

The present applicant proposes the present invention to solve the above-mentioned problems.

DISCLOSURE

Technical Problem

The present invention has been made in an effort to solve the above-mentioned problems, and an object of the present invention is to provide a current collector for a positive electrode, which is capable of reducing a thickness in comparison with a current collector using metal foil.

Another object of the present invention is to provide a current collector for a positive electrode, which is capable of reducing a weight in comparison with a current collector using metal foil.

Still another object of the present invention is to provide a current collector for a positive electrode, which is capable of having a larger resistance value than resistance of a current collector using metal foil, thereby reducing short-circuit current in the event of an internal short circuit.

Yet another object of the present invention is to provide a current collector for a positive electrode, which is capable of securely and stably connecting a lead tab to a current collector provided in the form of a film.

Technical Solution

To achieve the above-mentioned objects, a current collector for a positive electrode according to the present invention may include a base film, a conductive material provided on at least one of upper and lower surfaces of the base film, a metal piece provided on the upper or lower surface of the base film and electrically connected to the conductive material, and a lead tab joined to any one of the metal piece, the conductive material, and the base film and electrically connected to the conductive material, in which the conductive material is positioned between the metal piece and the base film or between the lead tab and the base film, and in which the lead tab is welded to one of the metal pieces provided on the upper and lower surfaces of the base film or welded to the metal piece provided on one surface of the base film that faces the lead tab.

The metal pieces may be respectively provided on the upper and lower surfaces of the base film, or the metal piece may be provided on any one of the upper and lower surfaces of the base film and the lead tab may be provided on the other of the upper and lower surfaces of the base film.

An insulating polymeric layer may be provided between the conductive material and the metal piece or between the conductive material and the lead tab.

The insulating polymeric layer may have bondability or adhesiveness.

The insulating polymeric layer may be melted at the same temperature as the base film or melted at a lower temperature than the base film.

A current pass may be formed only by a welded part or a welded point of the lead tab.

The insulating polymeric layer positioned between the conductive material and the metal piece or the insulating polymeric layer positioned between the conductive material and the lead tab may block or insulate a short-circuit current by insulating a portion between the conductive material and the metal piece or a portion between the conductive material and the lead tab except for a welded part of the lead tab.

The conductive material may be made of aluminum with a thickness of 2 μm or less based on a maximum cross-section.

The metal piece may be configured as aluminum foil or SUS 316 L foil.

Advantageous Effects

The current collector for a positive electrode according to the present invention uses the base film made of a nonconductor, instead of metal foil, thereby reducing weights of the electrode assembly and the battery.

In addition, the current collector for a positive electrode according to the present invention forms the coating or plating layer made of a conductive material on the surface of the base film, instead of using metal foil, thereby further reducing the thickness in comparison with the current collector using metal foil.

In addition, the current collector for a positive electrode according to the present invention may have a larger resistance value than resistance of the current collector using metal foil, and the flow of current may be hindered by damage to the base film or damage to the conductive material layer. Therefore, it is possible to reduce a short-circuit current and improve safety of the battery in the event of a short circuit.

In addition, according to the current collector for a positive electrode according to the present invention, the lead tab is welded to any one of the metal pieces in a state in which the metal pieces made of a metallic material are positioned on the two opposite upper and lower surfaces of the base film, or the lead tab is welded to the metal piece in a state in which the metal piece is positioned on any one of the two opposite upper and lower surfaces of the base film and the lead tab is positioned on the other of the two opposite upper and lower surfaces of the base film. Therefore, it is possible to securely and stably attach the lead tab to the base film and prevent deterioration in tensile strength of the part to which the lead tab is attached.

In addition, in the current collector for a positive electrode according to the present invention, the insulating polymeric layer is provided between the conductive material and the metal piece or between the conductive material and the lead tab, thereby improving safety of the battery in the event of a short circuit.

BEST MODE

Figure 1:
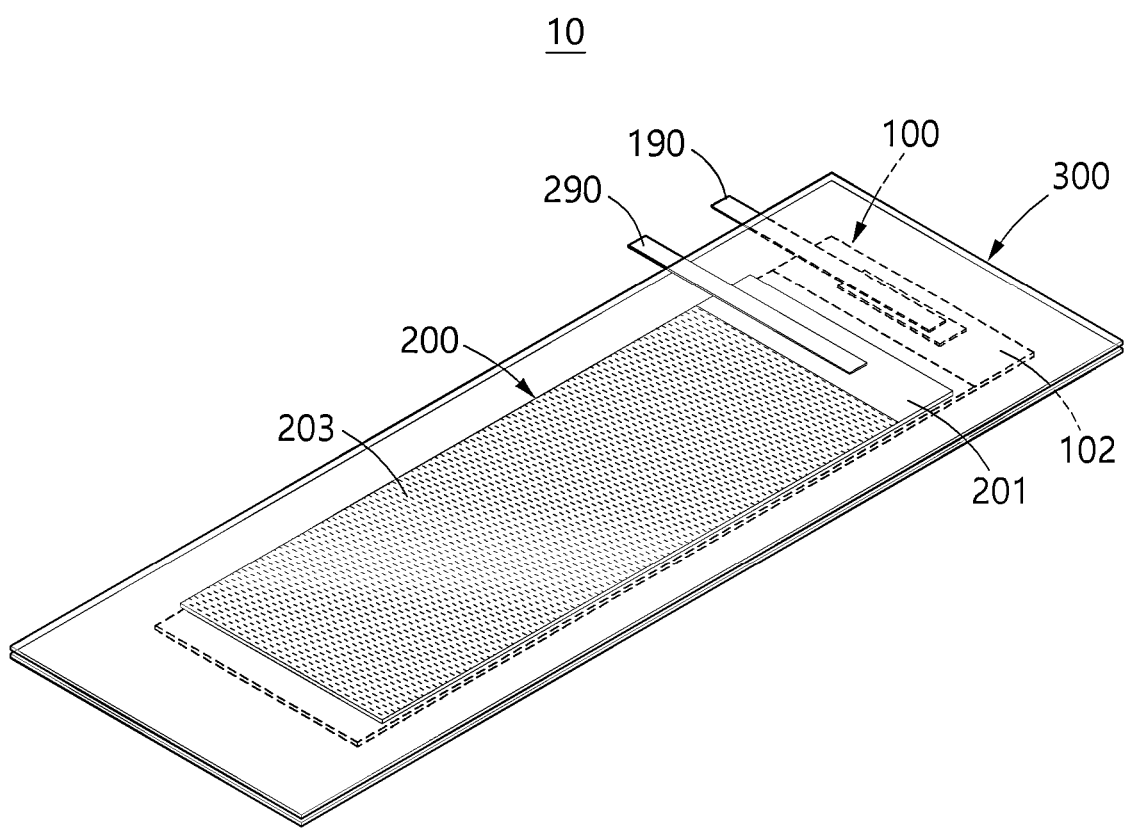
FIG. 1 is a perspective view illustrating an electrode assembly including a current collector for a positive electrode according to the present invention.

Hereinafter, embodiments according to the present invention will be described in detail with reference to the accompanying drawings. However, the present invention is not restricted or limited by the embodiments. Like reference numerals indicated in the respective drawings refer to like members.

Figure 2:
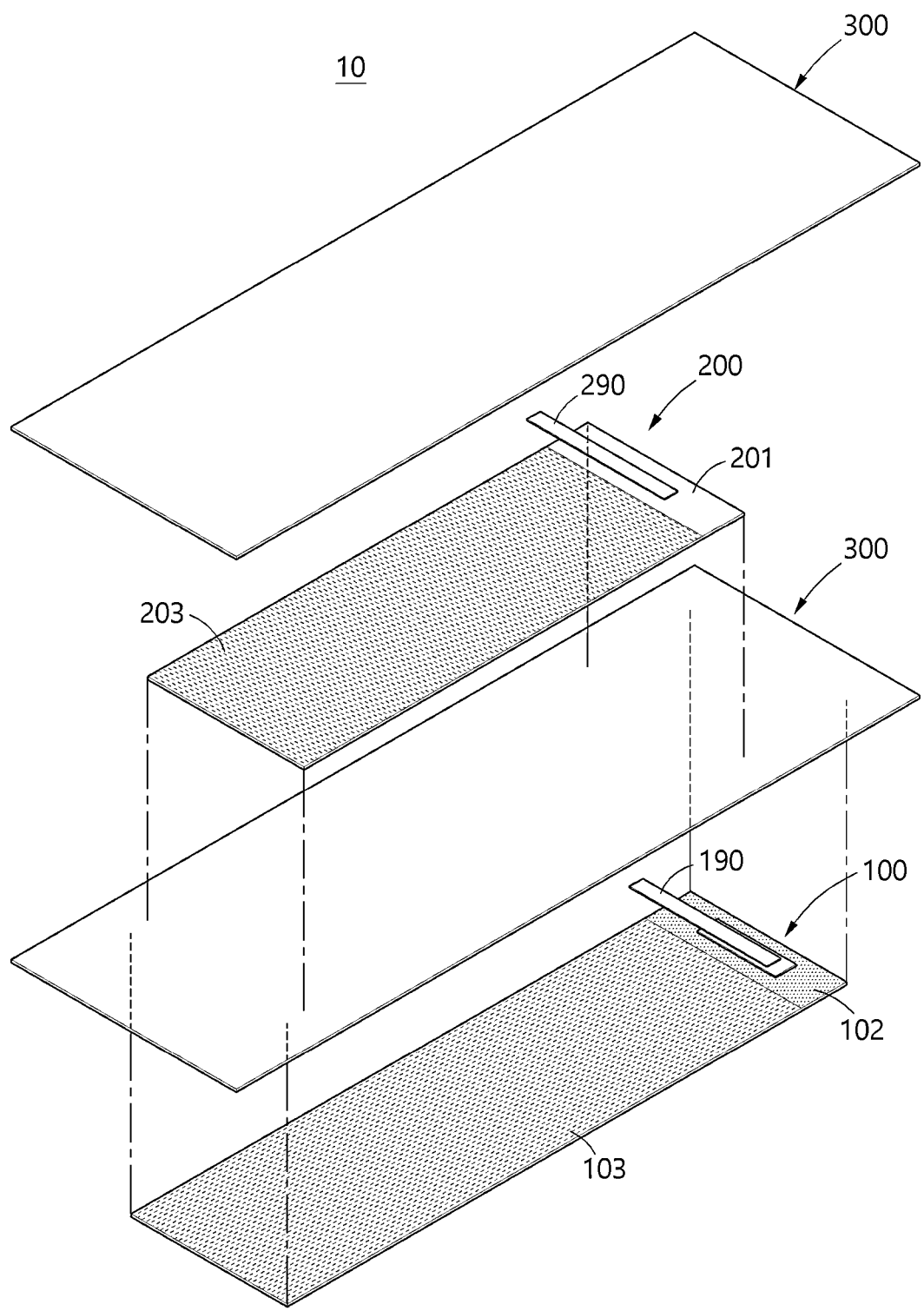
FIG. 2 is an exploded perspective view illustrating the electrode assembly according to the present invention.
Figure 3:
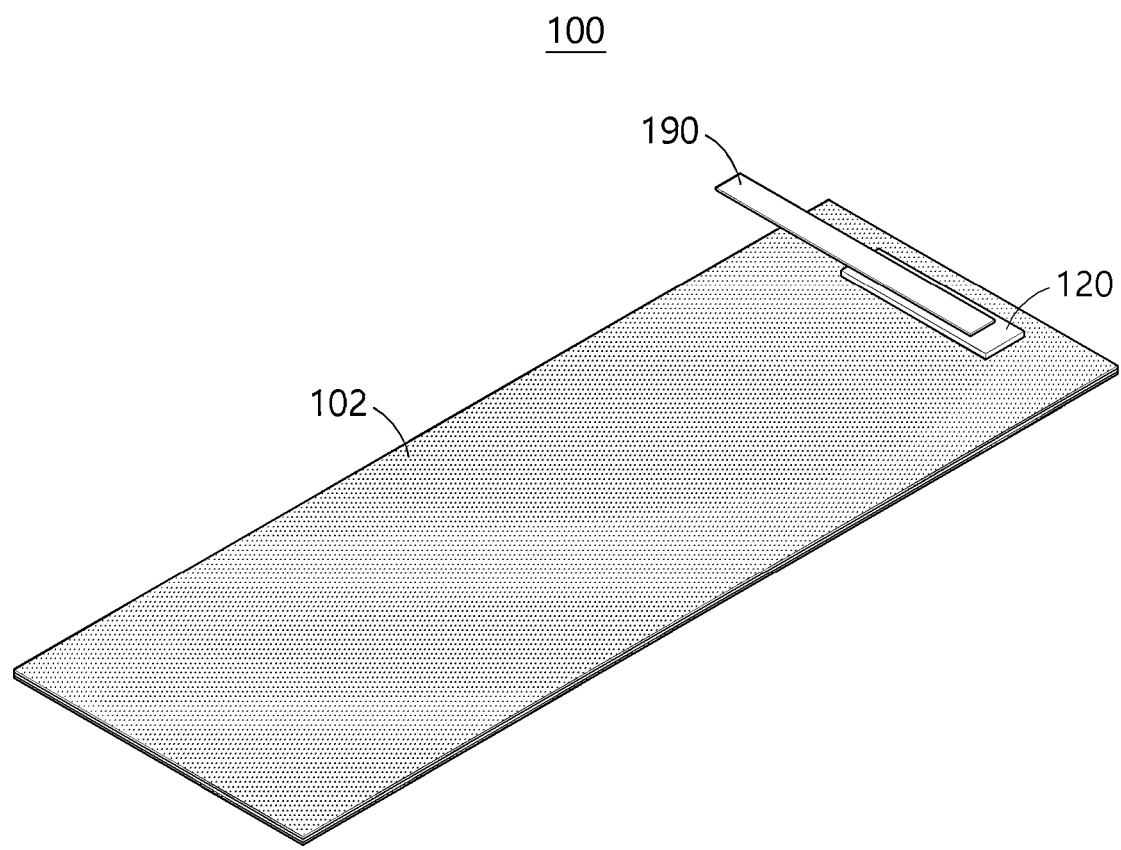
FIG. 3 is a perspective view illustrating the current collector for a positive electrode according to the present invention.
Figure 4:
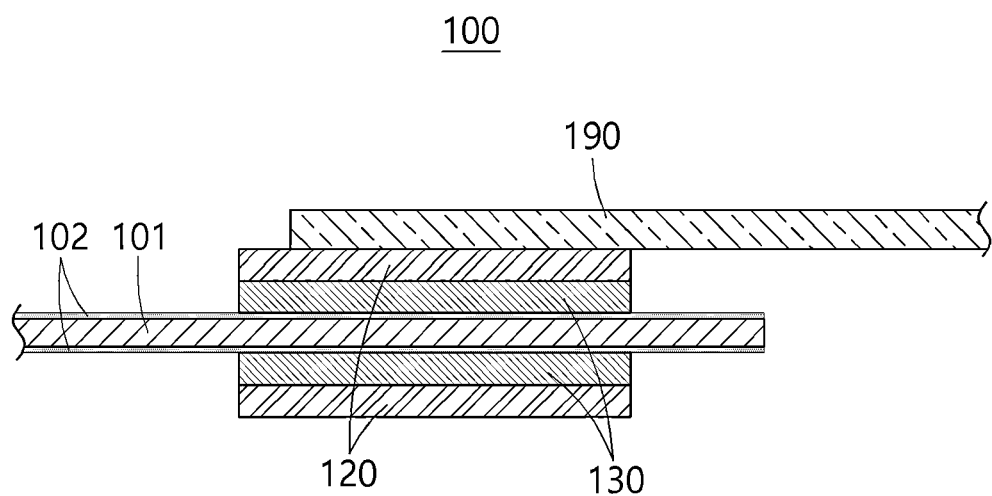
FIG. 4 is a cross-sectional view illustrating a current collector for a positive electrode according to a first embodiment of the present invention.
Figure 5:
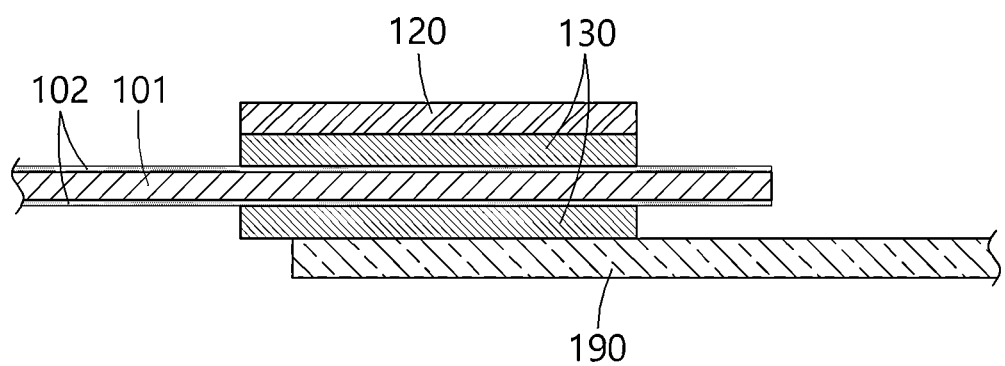
FIG. 5 is a cross-sectional view illustrating a current collector for a positive electrode according to a second embodiment of the present invention.
Figure 6:
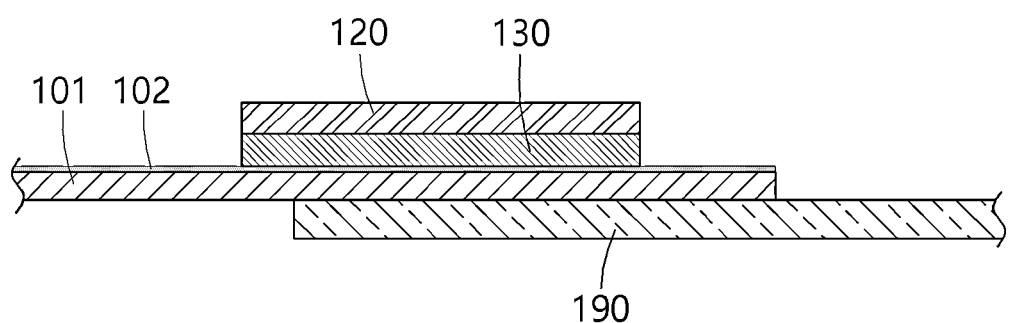
FIG. 6 is a cross-sectional view illustrating a current collector for a positive electrode according to a third embodiment of the present invention.
Figure 7:
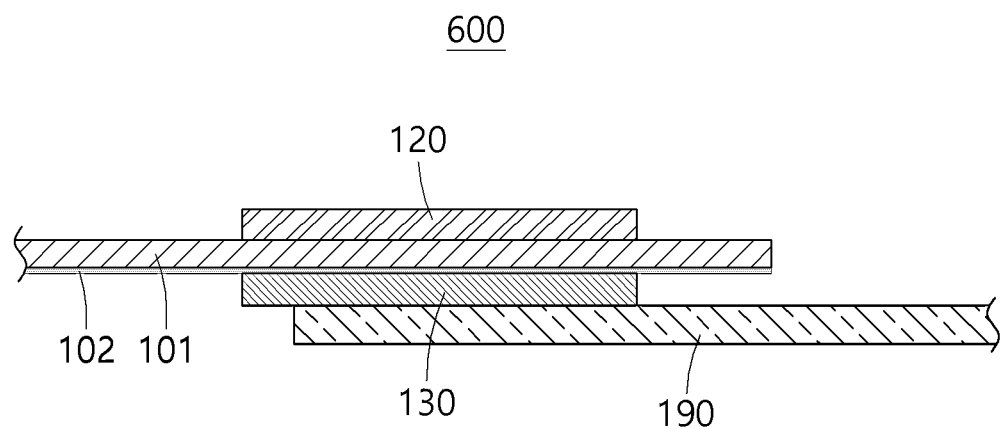
FIG. 7 is a cross-sectional view illustrating a current collector for a positive electrode according to a fourth embodiment of the present invention.
Figure 8:
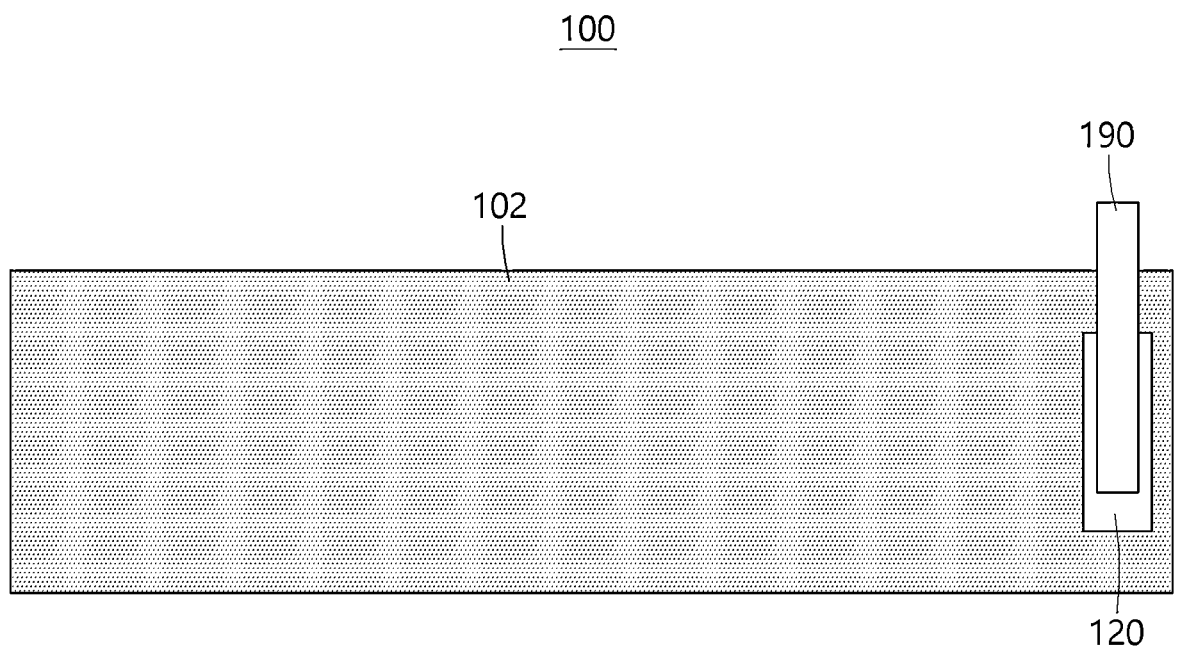
FIG. 8 is a top plan view illustrating the current collector for a positive electrode illustrated in FIG. 4.
Figure 9A:
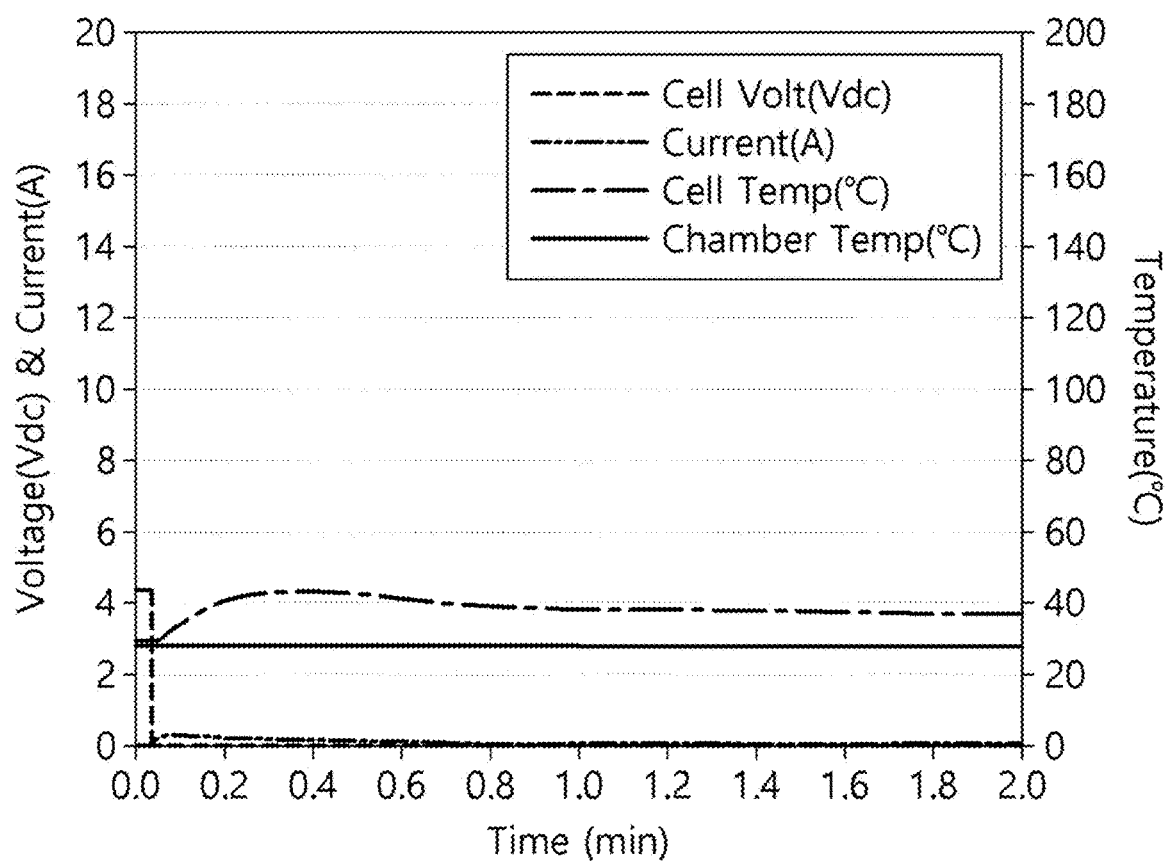
FIGS. 9A and 9B are graphs illustrating results of external short circuit tests performed on lead tab connection parts of secondary batteries including the electrode assemblies having the current collector for a positive electrode illustrated in FIG. 4 and the current collector for a positive electrode illustrated in FIG. 6.
Figure 9B:
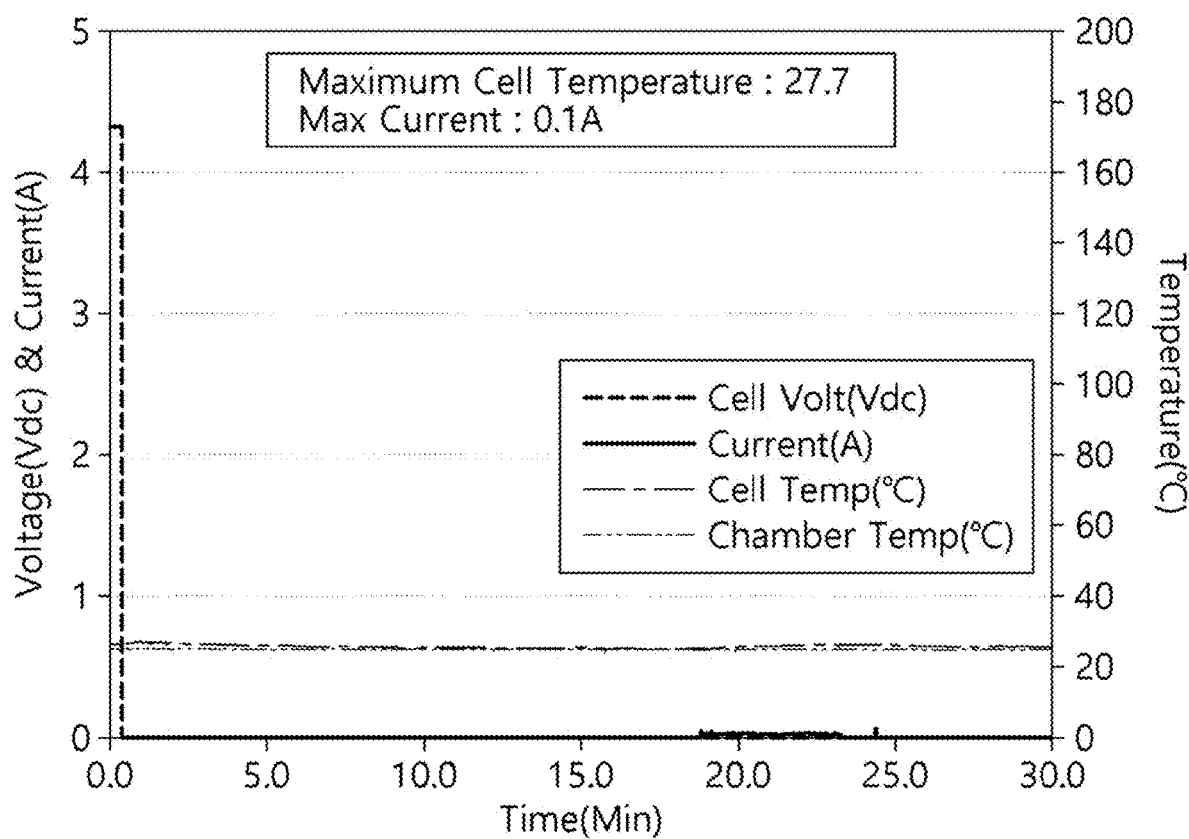

FIG. 1 is a perspective view illustrating an electrode assembly including a current collector for a positive electrode according to the present invention, FIG. 2 is an exploded perspective view illustrating the electrode assembly according to the present invention, FIG. 3 is a perspective view illustrating the current collector for a positive electrode according to the present invention, FIG. 4 is a cross-sectional view illustrating a current collector for a positive electrode according to a first embodiment of the present invention, FIG. 5 is a cross-sectional view illustrating a current collector for a positive electrode according to a second embodiment of the present invention, FIG. 6 is a cross-sectional view illustrating a current collector for a positive electrode according to a third embodiment of the present invention, FIG. 7 is a cross-sectional view illustrating a current collector for a positive electrode according to a fourth embodiment of the present invention, FIG. 8 is a top plan view illustrating the current collector for a positive electrode illustrated in FIG. 4, and FIGS. 9A and 9B are graphs illustrating results of external short circuit tests performed on lead tab connection parts of secondary batteries including the electrode assemblies having the current collector for a positive electrode illustrated in FIG. 4 and the current collector for a positive electrode illustrated in FIG. 6.

FIGS. 1 and 2 illustrate an electrode assembly 10 including a current collector 100 for a positive electrode (a cathode) according to the present invention. The current collector 100 for a positive electrode according to the present invention illustrated in FIGS. 1 and 2 is a positive electrode current collector. A surface of the current collector 100 for a positive electrode needs to be coated with a positive electrode active material 103 so that the current collector 100 for a positive electrode is used for the electrode assembly 10.

Meanwhile, a current collector 200 for a negative electrode (an anode) may have negative electrode metal foil 201 coated with a negative electrode active material 203, and a negative electrode lead tab 290 may be connected to one end of the current collector 200 for a negative electrode based on a longitudinal direction of the current collector 200 for a negative electrode.

A separator 300 is disposed between the current collector 200 for a negative electrode and the current collector 100 for a positive electrode according to the present invention. In a state illustrated in FIG. 2, as the current collector 200 for a negative electrode and the current collector 100 for a positive electrode are sequentially stacked with the separator 300 interposed therebetween, the electrode assembly 10 illustrated in FIG. 1 is made.

FIG. 3 illustrates the current collector 100 for a positive electrode according to the present invention. The current collector 100 for a positive electrode does not use metal foil unlike the current collector 200 for a negative electrode described above.

The current collector 100 for a positive electrode (current collector for cathode electrodes) according to the present invention illustrated in FIG. 3 has a larger resistance value than resistance of the current collector using the metal foil, such that the current collector 100 may adjust a limit current value of the current flowing in the current collector. Because the flow of current may be hindered by damage to a base film, the current collector 100 may reduce short-circuit current or prevent heat generation in the event of an internal short circuit of the secondary battery.

The lithium secondary battery having the current collector 100 for a positive electrode according to the present invention may have properties or concept of a max current limited battery (MCLB). Hereinafter, the current collector for a positive electrode according to the present invention, which enables implementation of the MCLB, will be described.

Since the current collector 100 for a positive electrode according to the present invention has a higher resistance value than the resistance of the positive electrode current collector of the battery in the related art using the metal foil, the current collector 100 may adjust the limit current and reduce the short-circuit current and heat generation occurring in the event of a short circuit by destroying a current pass in the event of the internal short circuit, thereby improving safety of the battery.

The current collector 100 for a positive electrode according to the present invention does not use the metal foil but uses a base film 101 made of a polymeric material as a basic material, and metal with a thin thickness may be applied onto the base film 101, or the base film 101 may be coated with metal.

Hereinafter, various shapes of the current collector 100 for a positive electrode according to the present invention will be described with reference to the drawings.

First, referring to FIGS. 4 to 7, a current collector 100, 400, 500, or 600 for a positive electrode according to the present invention includes: the base film 101; a conductive material 102 provided on at least one of upper and lower surfaces of the base film 101; a metal piece (metal element) 120 provided on the upper or lower surface of the base film 101 and electrically connected to the conductive material 102; and a lead tab 190 joined to any one of the metal piece 120, the conductive material 102, and the base film 101 and electrically connected to the conductive material 102. The conductive material 102 may be positioned between the metal piece 120 and the base film 101 or positioned between the lead tab 190 and the base film 101. The lead tab 190 may be welded to one of the metal pieces 120 provided on the upper and lower surfaces of the base film 101 or welded to the metal piece 120 provided on one surface of the base film 101 that faces the lead tab 190.

In this case, the conductive material 102 may be positioned between the metal piece 120 and the base film 101 or positioned between the base film 101 and the lead tab 190.

In this case, in the event of a short circuit, the conductive material 102 may serve as an electrochemical fuse through a reaction with an electrolyte, such that the conductive material 102 may have a function of preventing a short circuit. The electrochemical characteristics of the conductive material 102 will be described below.

The base film 101 may be provided in the form of a band having a predetermined length. In this case, the electrode assembly 10 to be described below may be formed as the base film 101 is supplied or transferred by a roll-to-roll method along a longitudinal direction thereof (i.e., a direction of a relatively long length).

The base film 101 may be made of a polymeric nonconductive material such as polyethylene (PE), polypropylene (PP), polybutylene terephthalate (PBT), polyimide (PI), or polyethylene terephthalate (PET).

The base film 101 may have a thickness of 50 μm or less, particularly, a thickness of 1.4 μm or more and 50 μm or less. The current collector 100 for a positive electrode according to the first embodiment of the present invention may reduce a thickness or weight of the battery in comparison with a case in which the current collector using the metal foil in the related art is used. The current collector 100 uses, as the base film 101, a polymeric film having a thickness of 1.4 μm or more and 50 μm or less and made of a nonconductive material, which makes it possible to an overall thickness or weight of the lithium secondary battery having the current collector 100, 400, 500, or 600 for a positive electrode according to the present invention.

Meanwhile, the base film 101 may be made of a material which is melted at a temperature lower than 300° C. The lead tab 190 is fixed to the base film 101 by welding. Unless the base film 101 is melted at a temperature lower than a welding temperature of the lead tab 190, the lead tab 190 cannot be coupled to the base film 101. Therefore, the base film 101 needs to have a melting point at which the base film 101 may be melted during the process of welding the lead tab 190. The base film 101 may have a melting point lower than 300° C.

Meanwhile, the current collector 100, 400, 500, or 600 for a positive electrode according to the present invention may include the conductive material 102 disposed on at least one of the upper and lower surfaces of the base film 101.

The conductive material 102 may be aluminum (Al), and the surface of the base film 101 may be plated or coated with the conductive material 102. Therefore, the conductive material 102 may be referred to as a conductive layer that defines an outermost surface of the current collector 100 for a positive electrode.

The conductive material 102 may be formed to adjust or reduce limit current or maximum current of the current collector 100, 400, 500, or 600 for a positive electrode. In other words, the conductive material 102 may be aluminum with which at least one of the upper and lower surfaces of the base film 101 is plated or coated to control conductivity of the current collector 100, 400, 500, or 600 for a positive electrode. When the description is focused on the state in which the surface of the base film 101 is plated or coated with the conductive material 102, the conductive material 102 may be referred to as the conductive layer. Hereinafter, it is noted that the conductive material 102 has the concept including the conductive layer.

It is possible to control or reduce the maximum amount of current flowing in the current collector 100, 400, 500, or 600 for a positive electrode by adjusting the amount of coating or a coating thickness of the conductive material 102 with which at least one of the upper and lower surfaces of the base film 101 is plated or coated. Therefore, it is possible to improve the safety of the lithium secondary battery and ensure safety of the battery in the event of a short circuit.

In other words, the limit current or the maximum current flowing in the current collector 100 for a positive electrode may be adjusted depending on the thickness or the amount of the conductive material 102 formed on the surface of the base film 101. As described above, the conductive material 102 of the current collector 100, 400, 500, or 600 for an electrode according to the present invention may implement properties or concept of the max current limited battery (MCLB) of the lithium secondary battery.

In addition, in the event of a physical internal short circuit or an external short circuit, the base film 101 may be melted and hinder rapid current generation, thereby improving safety of the battery. Further, when the conductive material 102 has a small thickness, electric potential of the aluminum layer constituting the conductive material 102 is reduced in the event of an internal short circuit or an external short circuit, which induces an electrochemical reaction between the aluminum layer and the electrolyte. Therefore, it possible to reduce the conductivity or block the current, thereby improving safety of the battery.

The conductive material 102 may be formed on the surface of the base film 101 in various ways. For example, when the conductive material 102 is made of metal, the conductive material 102 may be formed on the surface of the base film 101 by sputtering or evaporation coating.

It is possible to control the conductivity of the current collector 100 for a positive electrode or ensure safety of the battery depending on the amount (weight) or thickness of the conductive material 102 with which the surface of the base film is plated or coated. Therefore, it is necessary to use a method capable of controlling or adjusting the thickness or weight of the conductive material 102.

The thickness of the conductive material 102 with which the surface of the base film 101 is plated or coated may be determined depending on a length of the lead tab 190 and a length of the electrode (current collector). For example, when the length of the electrode (current collector) increases, a plating thickness of the conductive material 102 may also increase.

The conductive material 102 may be formed on only one surface of the base film 101 or both of the two opposite surfaces of the base film 101. In this case, the conductive material 102 may have a thickness of 2 μm or less based on a maximum cross-section.

In the current collector 100, 400, 500, or 600 for a positive electrode according to the present invention, the flow of current may be implemented by the conductive material 102. Therefore, the state in which the surface of the base film 101 is plated or coated with the conductive material 102 needs to be properly maintained. To this end, the base film 101 may be subjected to surface treatment, thereby increasing a binding force between the conductive material 102 and the base film 101.

If the binding force between the conductive material 102 and the base film 101 is low, the conductive material 102 may be detached or separated from the surface of the base film 101 in a state in which the electrolyte is injected. Therefore, it is important to increase the binding force between the conductive material 102 and the base film 101.

The surface treatment may be performed on the surface of the base film 101 to increase a bonding force or binding force with the conductive material 102.

The surface of the base film 101 may be subjected to corona treatment to increase the binding force between the conductive material 102 and the base film 101.

Meanwhile, the current collector 100, 400, 500, or 600 for a positive electrode according to the present invention may have the lead tab 190 configured to be connected to the external device.

In the case of the electrode current collector using the metal foil in the related art, the lead tab may be welded directly to the metal foil. In contrast, in the case of the current collector 100, 400, 500, or 600 for a positive electrode according to the present invention, the thin base film 101 corresponds to the metal foil in the related art. For this reason, the lead tab cannot be welded directly to the base film 101. That is, the lead tab 190 needs to be welded to the conductive material 102 formed on the upper or lower surface of the base film 101, but since the base film 101 is thin, sufficient tensile strength of a welded part cannot be ensured, which makes it difficult to attach the lead tab 190 to the base film 101. According to the current collector 100, 400, 500, or 600 for a positive electrode according to the present invention, the lead tab 190 is welded to the metal piece 120 made of a metallic material in the state in which the metal pieces 120 are attached to the upper and lower surfaces of the base film 101, or the lead tab 190 is welded to the metal piece 120 in the state in which the metal piece 120 is attached to one surface of the base film 101 and the lead tab 190 is attached to the other surface of the base film 101, which makes it possible to solve the above-mentioned problem.

According to the current collector 100, 400, 500, or 600 for a positive electrode according to the present invention, the lead tab 190 may be welded to the metal piece 120, the conductive material 102, or the base film 101 by ultrasonic welding, laser welding, or spot welding.

According to the current collectors 100, 400, 500, and 600 for a positive electrode according to the present invention illustrated in FIGS. 4 to 7, the metal piece 120 and the lead tab 190, which are made of metal, are positioned on the upper and lower surfaces of the base film 101, respectively.

Hereinafter, the current collectors 100, 400, 500, and 600 for a positive electrode will be described in more detail with reference to FIGS. 4 to 7.

First, in the current collector 100 for a positive electrode according to the first embodiment of the present invention illustrated in FIG. 4, the conductive materials 102 are provided on the upper and lower surfaces of the base film 101. The metal pieces 120 are respectively provided on the upper and lower surfaces of the base film 101 and respectively joined or connected to the upper and lower conductive materials 102. That is, the metal pieces 120 may be respectively joined or connected to the conductive materials 102 on the upper and lower surfaces of the base film 101. The lead tab 190 is welded to any one of the metal pieces 120 provided on the upper and lower surfaces of the base film 101, such that the lead tab 190 may be electrically connected to the metal piece 120 and the conductive material 102.

In this case, the metal piece 120 may serve to ensure a position on the base film 101 at which the lead tab 190 is welded. That is, the metal piece 120 may serve as a connection part of the lead tab 190.

The metal piece 120 may have a thickness of 5 μm or more. In this case, it is enough that the metal piece 120 is provided on only a part of the base film 101. The number of metal pieces 120 or the position of the metal piece 120 provided on the base film 101 is not limited. However, in the case in which the lead tab 190 is welded to the metal piece 120, the position on the metal piece 120 at which the lead tab 190 is welded may be determined in consideration of the shape of the electrode assembly.

As described above, the metal piece 120 may be provided in the form of a thin metal film or metal foil having a thickness of 5 μm or more, but the shape of the metal piece 120 is not necessarily limited thereto. That is, the metal piece 120 may be provided in the form of a thin film, foil, or a mesh.

The metal piece 120 may be configured as aluminum foil or SUS 316 L foil.

As described above, the metal piece 120 of the current collector 100 for a positive electrode according to the first embodiment of the present invention may ensure the welding position of the lead tab 190.

As illustrated in FIG. 4, the conductive materials 102 may be respectively formed on the two opposite upper and lower surfaces of base film 101, and the metal pieces 120 may be respectively provided on the two opposite upper and lower surfaces of the base film 101 and in contact with the upper and lower conductive materials 102. The lead tab 190 may be welded to any one of the upper and lower metal pieces 120. When the welding is performed, the base film 101 may be melted, such that the conductive material 102, the metal piece 120, and the lead tab 190 may be electrically connected.

In addition, referring to the current collector 100 for a positive electrode according to the first embodiment of the present invention illustrated in FIG. 4, insulating polymeric layers 130 may each be provided between the conductive material 102 and one surface of the metal piece 120 that faces the conductive material 102. The insulating polymeric layer 130 serves to attach the metal piece 120 to the surface of the base film 101 or the surface of the conductive material 102 or insulate the conductive material 102 and the metal piece 120. Referring to FIG. 4, the insulating polymeric layer 130 may be provided between the conductive material 102 and the metal piece 120.

The insulating polymeric layer 130 may be made of a material having bondability or adhesiveness. In addition, the insulating polymeric layer 130 may be made of a polymeric material or provided in the form of a polymeric film.

In the case in which the insulating polymeric layer 130 is provided in the form of a polymeric film, the insulating polymeric layer 130 may have a thickness smaller than 50 μm. If the thickness of the insulating polymeric layer 130 is larger than 50 μm, there is a problem in that welding is not properly performed and resistance increases (see Tables 1 and 2).

TABLE 1

| | Structure: Al foil/KMG + Al/Pet/Al + KMG/Al foil | | | Experimental Result | | |
|---|---|---|---|---|---|---|
| No. | Al-coated PET | Al foil | Weldability | Tensile Strength (Kgf/mm$^2$) | Resistance (Ω) (Front Surface) | Resistance (Ω) (Rear Surface) |
| 1-1 | 1 μm Al + 7 μm PET + 1 μm Al | 12 μm Al/ KMG 5 μm | OK | 0.12 | 0.068 | 0.060 |
| 1-2 | 1 μm Al + 7 μm PET + 1 μm Al | 12 μm Al/ KMG 10 μm | OK | 0.17 | 0.096 | 0.069 |
| 1-3 | 1 μm Al + 7 μm PET + 1 μm Al | 12 μm Al/ KMG 20 μm | OK | 0.21 | 0.103 | 0.097 |
| 1-4 | 1 μm Al + 7 μm PET + 1 μm Al | 12 μm Al/ KMG 30 μm | OK | 0.32 | 0.070 | 0.080 |
| 1-5 | 1 μm Al + 7 μm PET + 1 μm Al | 12 μm Al/ KMG 50 μm | NG | — | — | — |
| 1-6 | 1 μm Al + 7 μm PET + 1 μm Al | 12 μm Al/ KMG 100 μm | NG | — | — | — |

TABLE 2

| | Structure: Al foil/EVA + Al/PET/Al + EVA/Al foil | | | Experimental Result | | |
|---|---|---|---|---|---|---|
| No. | Al-coated PET | Al foil | Weldability | Tensile Strength (Kgf/mm$^2$) | Resistance (Ω) (Front Surface) | Resistance (Ω) (Rear Surface) |
| 2-1 | 1 μm Al + 7 μm PET + 1 μm Al | 12 μm Al/ EVA 5 μm | OK | 0.15 | 0.068 | 0.060 |
| 2-2 | 1 μm Al + 7 μm PET + 1 μm Al | 12 μm Al/ EVA 10 μm | OK | 0.16 | 0.096 | 0.095 |
| 2-3 | 1 μm Al + 7 μm PET + 1 μm Al | 12 μm Al/ EVA 20 μm | OK | 0.2 | 0.123 | 0.110 |
| 2-4 | 1 μm Al + 7 μm PET + 1 μm Al | 12 μm Al/ EVA 30 μm | OK | 0.21 | 0.050 | 0.050 |
| 2-5 | 1 μm Al + 7 μm PET + 1 μm Al | 12 μm Al/ EVA 50 μm | NG | — | — | — |

TABLE 2-continued

| | Structure: Al foil/EVA + Al/PET/Al + EVA/Al foil | | | Experimental Result | | |
|---|---|---|---|---|---|---|
| No. | Al-coated PET | Al foil | Weldability | Tensile Strength (Kgf/mm$^2$) | Resistance (Ω) (Front Surface) | Resistance (Ω) (Rear Surface) |
| 2-6 | 1 μm Al + 7 μm PET + 1 μm Al | 12 μm Al/ EVA 100 μm | NG | — | — | — |

The insulating polymeric layer 130 may be melted at the same temperature as the base film 101 or melted at a lower temperature than the base film 101. That is, the insulating polymeric layer 130 may have the same melting point as the base film 101 or a melting point lower in temperature than a melting point of the base film 101.

The insulating polymeric layer 130 may not only be made of a polymeric material such as polyethylene (PE), polypropylene (PP), polyvinylidene difluoride (PVDF), polyethylene terephthalate (PET), or polyimide (PI), but also be made of a polymeric material such as ethylene vinyl acetate (EVA) or acrylate-based compound having adhesive components.

The insulating polymeric layer 130 may not only serve to attach the metal piece 120 to the surface of the base film 101 or the conductive material 102 but also serve as an insulating layer. The insulating polymeric layer 130 is electrically connected to the conductive material 102 while being melted at the time of welding the lead tab 190, and a part of the lead tab 190, except for the welded part, is insulated by the insulating polymeric layer 130. In the case in which the electrically connected part is limited to the welded part, the conductive material 102 corresponding to the welded part reacts to reduce or block current in the event of an external short circuit. If the electrically connected part is large, a large amount of reaction is required, which makes it difficult to block the current. Therefore, in the case in which the metal piece 120 is attached to the conductive material 102, the insulating polymeric layer 130 having insulation may be provided between the conductive material 102 and the metal piece 120.

In this case, the insulating polymeric layers 130 and the metal pieces 120 respectively attached to the conductive materials 102 respectively provided on the two opposite surfaces of the base film 101 may be provided at the same position based on the base film 101.

The following Table 3 shows results of experiments performed on tensile strength, electrical conductivity, and the like of the base film 101 at the time of welding the lead tab 190 to the current collector 100 for an electrode illustrated in FIG. 4.

TABLE 3

| | Structure: Al foil (12 μm) + KMG (10 μm) + (Al/PET/Al) + Al foil (12 μm) + KMG (10 μm) + Al tab | | | Experimental Result | | |
|---|---|---|---|---|---|---|
| No. | Al-coated PET | Al tab | Weldability | Tensile Strength (Kgf/mm$^2$) | Resistance (Ω) (Front Surface) | Resistance (Ω) (Rear Surface) |
| 3-1 | 1 μm Al + 7 μm PET + 1 μm Al | 80 μm | OK | 0.5 | 0.135 | 0.124 |
| 3-2 | 1 μm Al + 7 μm PET + 1 μm Al | 100 μm | OK | 0.49 | 0.166 | 0.150 |

In Table 3, "Structure: Al foil (12 μm)+KMG (10 μm)+(Al/PET/Al)+Al foil (12 μm)+KMG (10 μm)+Al tab" means the current collector 100 for a positive electrode having a cross-sectional structure illustrated in FIG. 4. In this case, "Al foil" means the aluminum metal piece 120 having a thickness of 12 μm, and "KMG" means the insulating polymeric layer 130 which is a bonding agent from KMG made of acrylate-based compound having bondability and a thickness of 10 μm. "Al/PET/Al" means the base film 101 made of polymeric PET and having the two opposite upper and lower surfaces coated with the aluminum conductive materials 102, and "Al tab" means the lead tab 190 made of aluminum. In addition, "Resistance (Ω) (Front Surface)" means a value of resistance between the Al tab and a side of the conductive material layer to which the Al tab is attached, and "Resistance (Ω) (Rear Surface)" means a value of resistance between the Al tab and a side of the conductive material layer to which the Al tab is not attached. The resistance was measured by using Hioki 3555. The same also applied to the other experiments. Table 3 shows results of measuring weldability, tensile strength, and resistance in a state in which the aluminum conductive material 102 with a thickness of 1 μm is applied onto each of the two opposite upper and lower surfaces of the base film 101 made of PET and having a thickness of 7 μm and the lead tab 190 with a thickness of 80 μm (1-1) and 100 μm (1-2) is welded to any one of the metal pieces 120.

Meanwhile, in the experiment, the welding was performed by using an ultrasonic welder.

Referring to the results shown in Table 3, it can be ascertained that there is no problem during the process of welding the lead tab 190 to any one of the metal pieces 120 because the metal pieces 120 made of a metallic material are positioned on the two opposite upper and lower surfaces of the base film 101. In addition, it can be ascertained that tensile strength of the welded part of the lead tab 190 is ensured because the lead tab 190 is attached in the state in which the metal pieces 120 are provided on the two opposite upper and lower surfaces of the base film 101.

It can be ascertained that the experimental result similar to that shown in Table 3 is obtained even in a case in which EVA having bondability and a thickness or 10 μm is used, instead of KMG, as the insulating polymeric layer 130. In addition, it can be ascertained that the different conductive material layers are electrically connected through the welded parts.

Table 4 shows results of experiments performed on the current collector for a positive electrode in which the insulating polymeric layer 130 is removed from the current collector 100 illustrated in FIG. 4. Table 4 shows results of experiments performed on the current collector for a positive electrode having a structure in which the metal pieces 120 are respectively attached to the upper and lower conductive materials 102 and the lead tab 190 is welded to any one of the metal pieces 120.

lead tab 190 to any one of the metal pieces 120 because the metal pieces 120 made of a metallic material are positioned on the two opposite upper and lower surfaces of the base film 101. In addition, it can be ascertained that tensile strength of the welded part of the lead tab 190 is ensured because the metal pieces 120 are attached to the two opposite upper and lower surfaces of the base film 101 or the lead tab 190 is attached each of the two opposite upper and lower surfaces of the base film 101.

In this case, the metal pieces 120 respectively provided on the two opposite surfaces of the base film 101 may be provided at the same position.

Meanwhile, it is difficult to ensure tensile strength of the welded part in a case in which the metal piece 120 or the lead tab 190 is attached to only any one of the two opposite upper and lower surfaces of the base film 101. Table 5 shows results of experiments performed in the case in which both the metal piece 120 and the lead tab 190 are positioned on one surface of the base film 101.

TABLE 4

| | Structure: Al foil (12 μm) + (Al/PET/Al) + Al foil (12 μm) + Al tab | | Experimental Result | | |
|---|---|---|---|---|---|
| No. | Al-coated PET | Al tab | Weldability | Tensile Strength (Kgf/mm$^2$) | Resistance (Ω) (Front Surface) | Resistance (Ω) (Rear Surface) |
| 4-1 | 1 μm Al + 7 μm PET + 1 μm Al | 80 μm | OK | 0.6 | 0.098 | 0.065 |
| 4-2 | 1 μm Al + 7 μm PET + 1 μm Al | 100 μm | OK | 0.61 | 0.12 | 0.095 |

In Table 4, "Structure: Al foil (12 μm)+(Al/PET/Al)+Al foil (12 μm)+Al tab" means a cross-sectional shape of the current collector 100 for an electrode. In this case, "Al foil" means the aluminum metal piece 120 having a thickness of 12 μm, "Al/PET/Al" means the base film 101 made of polymeric PET and having the two opposite surfaces coated with the aluminum conductive materials 102, and "Al tab" means the lead tab 190 made of aluminum. Table 4 shows results of measuring weldability, tensile strength, and resistance in a state in which the aluminum conductive material 102 with a thickness of 1 μm is applied onto each of the two opposite upper and lower surfaces of the base film 101 made of PET and having a thickness of 7 μm and the lead tab 190 with a thickness of 80 μm (2-1) and 100 μm (2-2) is welded to any one of the metal pieces 120.

Referring to the results shown in Table 4, it can be ascertained that there is no problem with the welding of the

TABLE 5

| | Structure: Al tab + Al foil (12 μm) + (Al/PET/Al) | | Experimental Result | | |
|---|---|---|---|---|---|
| No. | Al-coated PET | Al tab | Weldability | Tensile Strength (Kgf/mm$^2$) | Resistance (Ω) (Front Surface) | Resistance (Ω) (Rear Surface) |
| 5-1 | 1 μm Al + 7 μm PET + 1 μm Al | 80 μm | OK | 0.03 | 0.103 | 0.053 |
| 5-2 | 1 μm Al + 7 μm PET + 1 μm Al | 100 μm | OK | 0.02 | 0.131 | 0.058 |

Table 5 shows results of experiments performed on the current collector for a positive electrode in which the metal piece 120 provided in the form of Al foil is positioned only any one of the upper and lower surfaces of the base film 101 and the lead tab 190 is welded to the metal piece 120. That is, Table 5 shows results of experiments performed on the current collector for a positive electrode in which metal is concentrated only one surface of the base film 101. It can be ascertained that tensile strength is very low in the results shown in Table 5 compared to Tables 3 and 4. If the tensile strength is low, it is impossible to weld the lead tab to the base film. FIG. illustrates the current collector 400 for a positive electrode according to the second embodiment of the present invention. Referring to FIG. 5, the current collector 400 for a positive electrode may include conductive materials 102 applied onto two opposite upper and lower surfaces of a base film 101, a metal piece 120 provided on a surface of one of the conductive materials 102, a lead tab 190 provided on a surface of the other of the conductive materials 102, an insulating polymeric layer 130 provided between the conductive material 102 and the metal piece 120, and an insulating polymeric layer 130 provided between the conductive material 102 and the lead tab 190.

In comparison with the current collector 100 for a positive electrode illustrated in FIG. 4, there is a difference in that the metal piece 120 is provided at one side of the base film 101, the lead tab 190 is provided at the other side of the base film 101, and the insulating polymeric layer 130 is provided between the metal piece 120 and the conductive material 102, but no metal piece 120 is provided between the insulating polymeric layer 130 and the lead tab 190. However, the current collector 400 for a positive electrode illustrated in FIG. 5 is similar to the current collector 100 for a positive electrode illustrated in FIG. 4 in that the members made of metal, i.e., the metal piece 120 and the lead tab 190 are respectively positioned on both the upper and lower surfaces of the base film 101.

The metal piece 120 and the lead tab 190 respectively provided on the two opposite upper and lower surfaces of the base film 101 may be provided at the same position.

The following Table 6 shows results of experiments performed on tensile strength, electrical conductivity, and the like of the base film 101 at the time of welding the lead tab 190 to the current collector 400 for a positive electrode illustrated in FIG. 5.

tab 190 with a thickness of 80 μm (4-1) and 100 μm (4-2) is welded directly to the conductive material 102.

Referring to the results shown in Table 6, it can be ascertained that there is no problem with the welding of the lead tab 190 because the metal piece 120 and the lead tab 190, which are made of a metallic material, are respectively positioned on the two opposite upper and lower surfaces of the base film 101. In addition, it can be ascertained that tensile strength of the welded part of the lead tab 190 is ensured because the lead tab 190 is welded in the state in which the metal piece 120 and the lead tab 190 are respectively provided on the two opposite upper and lower surfaces of the base film 101.

It can be ascertained that the experimental result similar to that shown in Table 6 is obtained even in a case in which EVA having bondability and a thickness or 10 μm is used, instead of KMG, as the insulating polymeric layer 130 provided between the conductive material 102 and the metal piece 120.

FIG. 6 illustrates the current collector 500 for a positive electrode according to the third embodiment of the present invention. Referring to FIG. 6, the current collector 500 for a positive electrode may include a conductive material 102 applied only onto any one of two opposite upper and lower surfaces of a base film 101, a metal piece 120 provided on a surface of the conductive material 102, a lead tab 190 provided on a surface of the base film 101 on which no conductive material 102 is provided, and an insulating polymeric layer 130 provided between the conductive material 102 and the metal piece 120.

In comparison with the current collector 400 for a positive electrode illustrated in FIG. 5, there is a difference in that the conductive material 102 and the metal piece 120 are provided only on one surface of the base film 101, only the lead tab 190 is provided on the other surface of the base film 101,

TABLE 6

| | Structure: Al foil (12 μm) + | | Experimental Result | | |
|---|---|---|---|---|---|
| | KMG (10 μm) + (Al/PET/Al) + KMG (10 μm) + Al tab | | Tensile Strength | Resistance (Ω) (Front | Resistance (Ω) (Rear |
| No. | Al-coated PET | Al tab | Weldability | (Kgf/mm²) | Surface) | Surface) |
| 6-1 | 1 μm Al + 7 μm PET + 1 μm Al | 80 μm | OK | 0.43 | 0.112 | 0.115 |
| 6-2 | 1 μm Al + 7 μm PET + 1 μm Al | 100 μm | OK | 0.45 | 0.12 | 0.13 |

In Table 6, "Structure: Al foil (12 μm)+KMG (10 μm)+ (Al/PET/Al)+KMG (10 μm)+Al tab" means the current collector for an electrode 400 having a cross-sectional structure illustrated in FIG. 5. In this case, "Al foil" means the aluminum metal piece 120 having a thickness of 12 μm, and "KMG" means the insulating polymeric layer 130 which is a bonding agent from KMG made of acrylate-based compound having bondability and a thickness of 10 μm. "Al/PET/Al" means the base film 101 made of polymeric PET and having the two opposite upper and lower surfaces coated with the aluminum conductive materials 102, and "Al tab" means the lead tab 190 made of aluminum. Table 6 shows results of measuring weldability, tensile strength, and resistance in a state in which the aluminum conductive material 102 with a thickness of 1 is applied onto each of the two opposite upper and lower surfaces of the base film 101 made of PET and having a thickness of 7 μm and the lead and the insulating polymeric layer 130 is provided between the metal piece 120 and the conductive material 102, but no insulating polymeric layer 130 is provided between the base film 101 and the lead tab 190. However, the current collector 500 for a positive electrode illustrated in FIG. 6 is similar to the current collector 100 illustrated in FIG. 4 and the current collector 400 for a positive electrode illustrated in FIG. 4 in that the members made of metal, i.e., the metal piece 120 and the lead tab 190 are respectively positioned on both the upper and lower surfaces of the base film 101.

The metal piece 120 and the lead tab 190 respectively provided on the two opposite upper and lower surfaces of the base film 101 may be provided at the same position.

The following Table 7 shows results of experiments performed on tensile strength, electrical conductivity, and the like of the base film 101 at the time of welding the lead tab 190 to the current collector 500 for a positive electrode illustrated in FIG. 6.

TABLE 7

| | | Experimental Result | | | |
|---|---|---|---|---|---|
| Structure: Al foil (12 μm ) + KMG (10 μm ) + (Al/PET) + Al tab (80 μm ) | | | | | |
| No. Al-coated PET | Weldability | Tensile Strength (Kgf/mm$^2$) | Resistance 1 (Ω) | Resistance 2 (Ω) | Resistance 3 (Ω) |
| 7-1  1 μm Al + 7 μm PET | OK | 0.36 | 0.087 | 0.050 | 0.047 |

In Table 7, "Structure: Al foil (12 μm)+KMG (10 μm)+ (Al/PET)+Al tab (80 μm)" means the current collector 500 for an electrode having a cross-sectional structure illustrated in FIG. 6. In this case, "Al foil" means the aluminum metal piece 120 having a thickness of 12 μm, and "KMG" means the insulating polymeric layer 130 which is a bonding agent from KMG made of acrylate-based compound having bondability and a thickness of 10 μm. "Al/PET" means the base film 101 made of polymeric PET and having an upper surface coated with the aluminum conductive material 102, and "Al tab" means the lead tab 190 made of aluminum and having a thickness of 80 μm. In addition, Resistance 1 means resistance measured between the metal piece 120 and the conductive material 102, Resistance 2 means resistance measured between the metal piece 120 and the lead tab 190, and Resistance 3 means resistance measured between the conductive material 102 and the lead tab 190. Table 7 shows results of measuring weldability, tensile strength, and resistance in a state in which the aluminum conductive material 102 with a thickness of 1 μm is applied onto the upper surface of the base film 101 made of PET and having a thickness of 7 μm and the lead tab 190 with a thickness of 80 μm is welded to a lower surface of the base film 101.

Referring to the results shown in Table 7, it can be ascertained that there is no problem with the welding of the lead tab 190 because the metal piece 120 and the lead tab 190, which are made of a metallic material, are respectively positioned on the two opposite upper and lower surfaces of the base film 101. In addition, it can be ascertained that tensile strength of the welded part of the lead tab 190 is ensured because the lead tab 190 is welded in the state in which the metal piece 120 and the lead tab 190 are respectively provided on the two opposite upper and lower surfaces of the base film 101. In addition, according to a result of analyzing measured values of Resistance 1 to 3, it can be ascertained that electrical conductivity is also good.

In the current collector 500 for a positive electrode according to the third embodiment of the present invention illustrated in FIG. 6, the lead tab 190 is attached to one surface of the base film 101 onto which no aluminum conductive material 102 is applied. Therefore, the lead tab 190 does not meet the separator and the negative electrode at the time of forming the electrode assembly by folding inward the surface on which no conductive material 102 is provided. Therefore, there is an advantage in that no separate protective film is required to prevent a short circuit of the lead tab 190.

FIG. 7 illustrates the current collector 600 for a positive electrode according to the fourth embodiment of the present invention. Referring to FIG. 7, the current collector 600 for a positive electrode may include a conductive material 102 applied only onto any one of the two opposite upper and lower surfaces of the base film 101, a lead tab 190 provided on a surface of the conductive material 102, a metal piece 120 provided on a surface of the base film 101 on which no conductive material 102 is provided, and an insulating polymeric layer 130 provided between the conductive material 102 and the lead tab 190.

The metal piece 120 and the lead tab 190 respectively provided on the two opposite upper and lower surfaces of the base film 101 may be provided at the same position.

The current collector 600 for a positive electrode illustrated in FIG. 7 differs from the current collector 400 for a positive electrode illustrated in FIG. 6 in that the positions of the metal piece 120 and the lead tab 190 are reversed. However, the current collector 600 for a positive electrode illustrated in FIG. 7 is similar to the current collector 100 for a positive electrode illustrated in FIG. 4, the current collector 400 for a positive electrode illustrated in FIG. 4, and the current collector 500 for a positive electrode illustrated in FIG. 6 in that the members made of metal, i.e., the metal piece 120 and the lead tab 190 are respectively positioned on both the upper and lower surfaces of the base film 101. Therefore, it can be seen that the current collector 600 for a positive electrode according to the fourth embodiment of the present invention illustrated in FIG. 7 may also ensure sufficient tensile strength of the welded part of the lead tab 190 and have excellent electrical conductivity.

According to the current collector 100, 400, 500, or 600 for a positive electrode according to the present invention, tensile strength of the welded part of the base film 101 or the lead tab 190 is good even in the case in which the insulating polymeric layer 130 made of a polymer is provided on at least one of the upper or lower surface of the base film 101 because the member made of metal, i.e., the metal piece 120 or the lead tab 190 is positioned on each of the two opposite surfaces of the base film 101.

When the lead tab 190 is welded, the lead tab 190 is joined as the insulating polymeric layer 130 and the base film 101 are melted at the welded part, such that the lead tab 190 may be electrically connected to the conductive material 102.

TABLE 8

| | Structure: Al foil (12 μm) + PE (16 μm) + (Al/PET) + PE (16 μm) + Al foil (12 μm) | | Experimental Result | | |
|---|---|---|---|---|---|
| No. | Al-coated PET | Weldability | Tensile Strength (Kgf/mm$^2$) | Resistance (Ω) (Front Surface) | Resistance (Ω) (Rear Surface) |
| 8-1 | 1 μm Al + 7 μm PET + 1 μm Al | OK | 0.40 | 0.155 | 0.125 |

TABLE 9

| | Structure: Al foil (12 μm) + PI (12 μm) + (Al/PET) + PI (12 μm) + Al foil (12 μm) | | Experimental Result | | |
|---|---|---|---|---|---|
| No. | Al-coated PET | Weldability | Tensile Strength (Kgf/mm$^2$) | Resistance (Ω) (Front Surface) | Resistance (Ω) (Rear Surface) |
| 9-1 | 1 μm Al + 7 μm PET + 1 μm Al | NG | — | — | — |

Tables 8 and 9 show results of experiments performed on weldability in a case in which the insulating polymeric layer is made of PE or PI higher in melting point than KMG or EVA. It can be ascertained that PE having a lower melting point than PET may be welded and have similar tensile strength and resistance values to KMG or EVA applied to the insulating polymeric layer. In contrast, it can be ascertained that PI having a high melting point is not welded well. FIG. 8 is a top plan view illustrating the current collector 100 for a positive electrode according to the first embodiment of the present invention. Referring to FIG. 8, the metal piece 120 is positioned on the conductive material 102, and the lead tab 190 is positioned on the metal piece 120. In this case, the insulating polymeric layer 130 is present between the metal piece 120 and the conductive material 102. During the process of welding the lead tab 190, a welded point is formed as the insulating polymeric layer 130 and the base film 101 are melted. That is, as illustrated in FIG. 8, the lead tab 190 is welded as the insulating polymeric layer 130 positioned between the metal piece 120 and the conductive material 102 is melted. The electrical connection is implemented only by the welded point connected as the insulating polymeric layer 130 is melted. In the case in which the insulating polymeric layer 130 is present as described above, the electrical connection forms a current pass at a very small portion only on the welded point at the time of welding the lead tab 190. As a result, it is possible to insulate a portion between the lead tab 190 and the conductive material 102 or between the metal piece 120 and the conductive material 102. In addition, the remaining part, except for the welded point, is exposed to the electrolyte or is in a state in which the electrolyte easily permeates into the remaining part.

If no insulating polymeric layer is provided between the lead tab or metal piece and the conductive material, the conductive material is in direct contact with the lead tab or the metal piece. In this case, the lead tab or the metal piece is in physical contact with the conductive material in an area corresponding to a size of the lead tab or the metal piece. In the case of the current collector for a positive electrode in which the lead tab or the metal piece is in physical contact with the conductive material on the welded part of the lead tab as described above, no insulating polymeric layer is provided between the metal piece and the conductive material. Therefore, a surface contact corresponding to an area of the metal piece is provided, and a reaction area is inevitably large. For this reason, it is difficult to allow all the conductive materials applied onto the surface of the base film to react. When an external short circuit occurs on the battery using the current collector for a positive electrode, the current pass is maintained, which may cause an increase in temperature of the battery without blocking current (see FIG. 10A).

FIGS. 9A and 9B are graphs illustrating results of external short circuit tests performed on lead tab connection parts of secondary batteries including the electrode assemblies having the current collector 100 for a positive electrode according to the first embodiment of the present invention and the current collector 500 for a positive electrode according to the third embodiment of the present invention.

FIG. 9A illustrates the result of the test performed in a case in which a capacity of the battery including the current collector 100 for a positive electrode is 400 mAh. The current collector 500 for a positive electrode may include the base film 101 made of PET and having the two opposite surfaces on which the aluminum conductive materials 102 are formed, the metal pieces 120 made of aluminum and being in contact with the conductive materials 102 on the two opposite surfaces of the base film 101, the insulating polymeric layers 130 made of KMG and provided between the conductive materials 102 and the metal pieces 120, and the lead tab 190 welded to any one of the metal pieces 120.

FIG. 9B illustrates the result of the test performed in a direction in which a capacity of the battery including the current collector 500 for a positive electrode is 1000 mAh. The current collector 300 for a positive electrode may include the base film 101 made of PET and having a cross-section on which the aluminum conductive material 102 is formed, the metal piece 120 made of aluminum and being in contact with the conductive material 102 on the base film 101, the conductive insulating polymeric layer 130 provided between the conductive material 102 and the metal piece 120, and the lead tab 190 joined to one surface of the base film 101 on which no conductive material 102 is provided.

In the current collector 100 or 500 for a positive electrode used for the test, a composition consisting of lithium cobalt oxide (LCO, Umicore) of 95%, conductive material (Super-P, Timcal) of 2.5%, binder (5130, Solef) of 2.5% was used for the positive electrode, and a composition consisting of graphite (BGF-L, BTR) of 97.1%, conductive material (Super-P, Timcal) of 0.3%, binder SBR (BM-400B, Zeon) of 1.3%, CMC (BSH12, Nippon Paper) of 1.3% was used for the negative electrode. In addition, a PE separator (SETELA FO7BC, Toray Tonen) was used as the separator, and EC/EMC=½, 1M LiPF6 (Panaxetec) was used for the electrolyte. A product of 88 um from DNP was used as a pouch, and a product from Shinhwa Itek, made of Al (with thickness of 0.1 mm and width of 3 mm) and Cu (with thickness of 0.1 mm and width of 3 mm), was used as the lead tab.

The battery was charged up to 4.35 V, and then an external short circuit test was performed. In this case, an acrylate-based compound product from KMG was used for the insulating polymeric layer 130.

It can be seen from FIG. 9A that a small amount of current is formed and an increase in temperature of the battery is small. In addition, it can be seen from FIG. 9B that the current is blocked well, and there is no increase in temperature of the battery. In the current collector 500 for a positive electrode which is a subject for the experiments illustrated in FIGS. 9A and 9B, the conductive material 102 is formed only on the cross-section of the base film 101, and the insulating polymeric layer 130 is positioned between the conductive material 102 and the metal piece 120. Therefore, the current pass may be formed only in a narrow part by the insulating polymeric layer 130 melted during welding, and the electrolyte may easily permeate or impregnate into one surface of the base film 101 on which no insulating polymeric layer 130 is provided. Therefore, it can be seen that it is possible to effectively prevent an increase in temperature of the battery and ensure very high safety against the external short circuit.

Figure 10A:
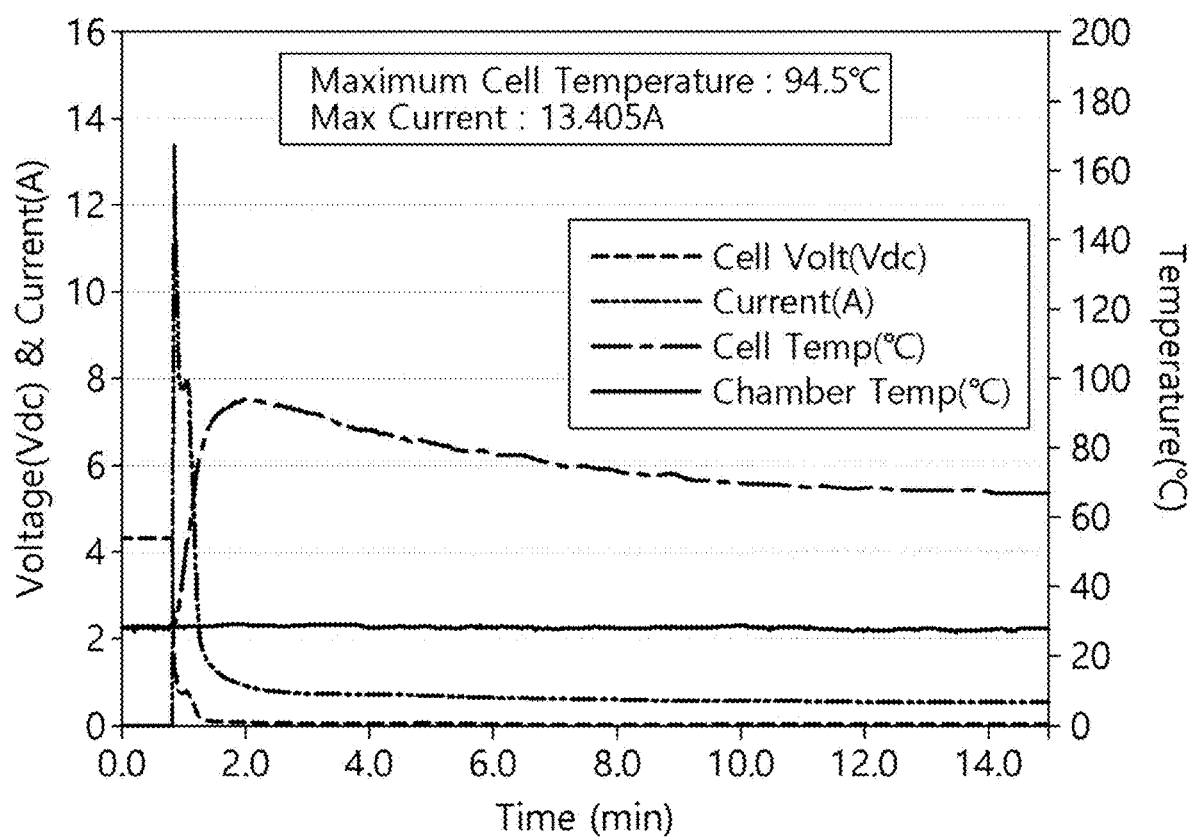
FIGS. 10A and 10B are graphs illustrating results of external short circuit experiments performed on the battery using the current collector for a positive electrode having no insulating polymeric layer.
Figure 10B:
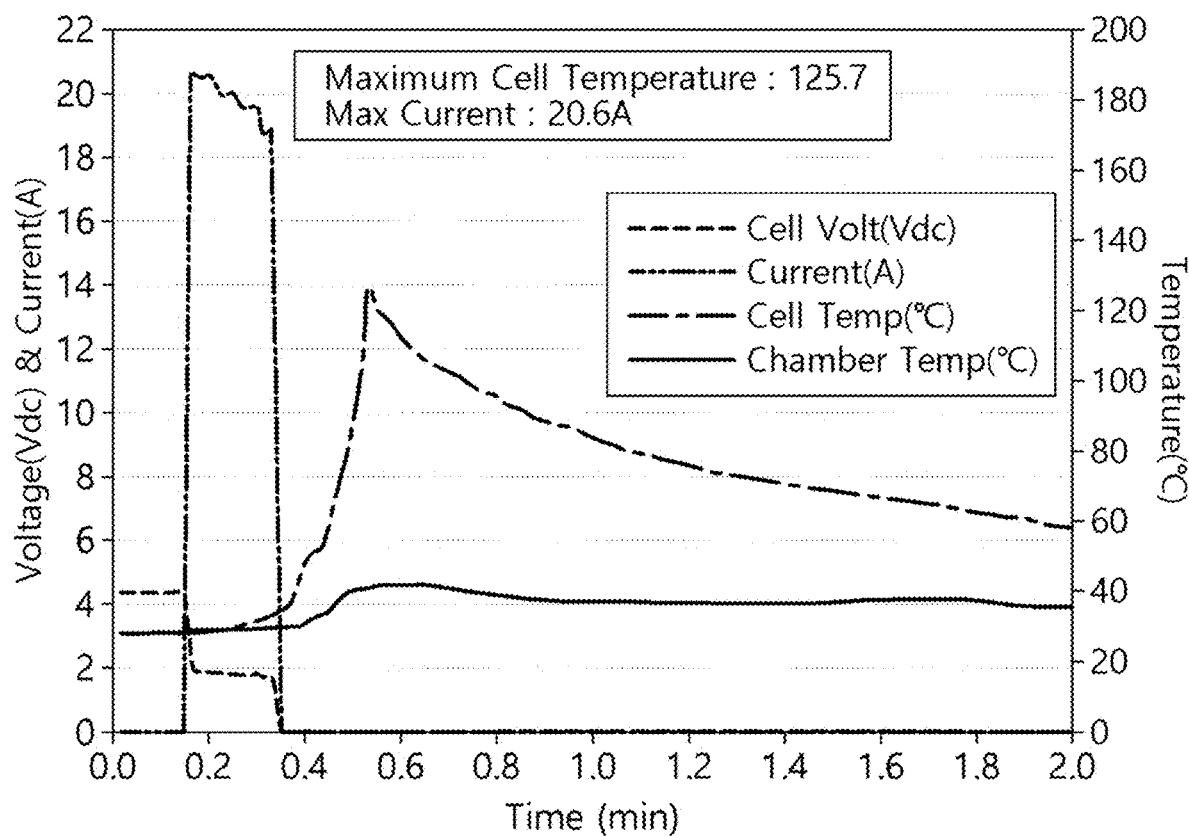

FIGS. 10A and 10B are graphs illustrating results of external short circuit experiments performed on the battery using the current collector for a positive electrode having no insulating polymeric layer.

In the current collector for a positive electrode which is a subject for the experiments illustrated in FIGS. 10A and 10B, the aluminum conductive materials are applied onto the two opposite surfaces of the base film, the metal pieces are positioned on the two opposite upper and lower surfaces of the base film, and the lead tab is welded to any one of the metal pieces by ultrasonic welding. A capacity of the battery was 400 mAh (see FIG. 10A) and 1000 mAh (see FIG. 10B) and a short circuit test was performed after the battery wad fully charged.

The experimental result illustrated in FIG. 10B indicates that as the short circuit occurs, a large amount of current flows, a temperature of the battery increases, and the battery ignites. Unlike the current collector 500 for a positive electrode used for the experiment illustrated in FIG. 9, the metal piece is in direct contact with the conductive material without the insulating polymeric layer in the current collector for a positive electrode used for the experiment illustrated in FIG. which causes surface contact with the current pass. For this reason, the current pass cannot be perfectly blocked and the battery ignites in the event of a short circuit.

The result of the experiment on the external short circuit illustrated in FIGS. 9A and 9B, and 10A and 10B indicates that when the insulating polymeric layer 130 made of an insulating material is provided at boundaries between the conductive material 102, the metal piece 120, and the lead tab 190, the electrical connection of the lead tab 190 is formed only on the welded point (welded part) connected when the insulating polymeric layer 130 is melted. Therefore, it can be seen that the configuration is advantageous in blocking the current pass and improving safety of the battery in the event of a short circuit.

In addition, at least one of the two opposite upper and lower surfaces of the base film 101 may have a structure in which there is a portion where the insulating polymeric layer 130 is not attached, thereby allowing the electrolyte to easily permeate (impregnate). That is, the surface of the base film has a porous structure advantageous in electrolyte impregnation. Alternatively, the surface of the base film may have a structure in which the insulating polymeric layer 130 is provided on any one of the metal piece 120 and the conductive material 102 only at one side of the base film 101, such that the electrolyte may permeate through a portion where no insulating polymeric layer is provided. In addition, the gelling properties of the electrolyte may be advantageous in the permeation of the electrolyte.

In the case of the current collector 100, 400, 500, or 600 for a positive electrode according to the present invention described above, the metal piece 120 or the lead tab 190 needs to be provided on the two opposite upper and lower surfaces of the base film 101 to make electric conduction and attach the metal piece 120 and the lead tab 190 to the two opposite upper and lower surfaces of the base film 101 onto which the conductive materials 102 are applied. For example, the metal pieces need to be provided on the two opposite upper and lower surfaces of the base film. Alternatively, the metal piece needs to be provided on one surface of the base film, and the lead tab needs to be provided on the other surface of the base film. If the metal piece or the lead tab is provided only on one surface of the base film, bonding strength or tensile strength of the welded part of the lead tab is low, which makes it difficult to use the lead tab.

In addition, the insulating polymeric layer 130 made of a polymer capable of being melted while making insulation needs to be provided between the metal piece 120 and the conductive material 102 or between the lead tab 190 and the conductive material 102 in order to ensure performance in blocking the current pass and improve safety of the battery in the event of an external short circuit. In this case, the electrical connection is made only by the welded point (welded part) of the lead tab 190 because of the insulating polymeric layer 130.

While the exemplary embodiments of the present invention have been described above with reference to particular contents such as specific constituent elements, the limited exemplary embodiments, and the drawings, but the exemplary embodiments are provided merely for the purpose of helping understand the present invention overall, and the present invention is not limited to the exemplary embodiment, and may be variously modified and altered from the disclosure by those skilled in the art to which the present invention pertains. Accordingly, the spirit of the present invention should not be limited to the described embodiment, and all of the equivalents or equivalent modifications of the claims as well as the appended claims belong to the scope of the spirit of the present invention.

The invention claimed is:

1. A current collector for a positive electrode, the current collector comprising:
 a base film;
 a conductive material provided on at least one of upper and lower surfaces of the base film;
 a metal piece provided on the upper or lower surface of the base film and electrically connected to the conductive material;
 a lead tab joined to any one of the metal piece, the conductive material, and the base film and electrically connected to the conductive material, and
 an insulating polymetric layer provided between the conductive material and the metal piece or between the conductive material and the lead tab, wherein the conductive material is positioned between the metal piece and the base film or between the lead tab and the base film, wherein the lead tab is welded to the metal piece provided on the upper or lower surface of the base film, and wherein during the processing of welding the lead tab, the insulating polymeric layer positioned between the conductive material and the metal piece or between the conductive material and the lead tab is melted together with the base film, so that the lead tab is welded to the metal piece, an electrical connection between the lead tab and the conductive material is established only at a welded point formed by melting the insulating polymeric layer, and a current pass is formed only in a narrow part of the welded point, and wherein insulation is provided between the lead tab and the conductive material or between the metal piece and the conductive material by the insulating polymeric layer present in a remaining part of the insulating polymeric layer excluding the welded point.

2. The current collector of claim 1, the metal piece is provided on any one of the upper and lower surfaces of the base film and the lead tab is provided on the other of the upper and lower surfaces of the base film, or the metal piece is provided on the upper surface of the base film and another metal piece having the same structure as the metal piece is provided on the lower surface of the base film.

3. The current collector of claim 2, wherein the insulating polymeric layer is formed to have a thickness less than 50 µm, which allows welding of the lead tab to the metal piece and prevents increased resistance of the current collector.

4. The current collector of claim 3, wherein the insulating polymeric layer has bondability or adhesiveness.

5. The current collector of claim 4, wherein the insulating polymeric layer is melted at the same temperature as the base film or melted at a lower temperature than the base film.

6. The current collector of claim 1, wherein a current pass is at least one of the upper and lower surfaces of the base film has a structure in which there is a portion where the insulating polymeric layer is not provided so that the electrolyte permeates or impregnates the base film through the at least one of the upper and lower surfaces of the base film.

7. The current collector of claim 6, wherein the insulating polymeric layer positioned between the conductive material and the metal piece or the insulating polymeric layer positioned between the conductive material and the lead tab blocks or insulates a short-circuit current.

8. The current collector of claim 6, wherein the conductive material is made of aluminum with a thickness of 2 µm or less based on a maximum cross-section.

9. The current collector of claim 8, wherein the metal piece is configured as aluminum foil or SUS 316 L foil.

* * * * *